United States Patent
Pearce, Jr.

(10) Patent No.: US 9,617,137 B1
(45) Date of Patent: Apr. 11, 2017

(54) OIL DRAINAGE APPARATUS FOR A LAWN MOWER

(71) Applicant: Edward Pearce, Jr., Zebulon, NC (US)

(72) Inventor: Edward Pearce, Jr., Zebulon, NC (US)

( * ) Notice: Subject to any disclaimer, the term of this patent is extended or adjusted under 35 U.S.C. 154(b) by 0 days.

(21) Appl. No.: 15/134,941

(22) Filed: Apr. 21, 2016

(51) Int. Cl.
*B65B 39/00* (2006.01)
*B67C 11/02* (2006.01)
*A01D 34/00* (2006.01)

(52) U.S. Cl.
CPC ............ *B67C 11/02* (2013.01); *A01D 34/001* (2013.01); *B67C 2011/022* (2013.01)

(58) Field of Classification Search
CPC .. B67C 11/02; B67C 2011/022; A01D 34/001
See application file for complete search history.

(56) References Cited

U.S. PATENT DOCUMENTS

| | | |
|---|---|---|
| 4,022,257 A | 5/1977 | O'Connell |
| 4,195,710 A | 4/1980 | Garrison |
| 4,403,466 A | 9/1983 | Tillotson et al. |

FOREIGN PATENT DOCUMENTS

GB    2159129    *   5/1984    ............. B67C 11/02

* cited by examiner

*Primary Examiner* — Jason K Niesz
(74) *Attorney, Agent, or Firm* — Stevenson IP, LLC

(57) ABSTRACT

An oil drainage apparatus for a lawn mower including a tapered semi-cylindrical upper funnel having a semicircular top surface and a semicircular bottom surface. A semicircular bottom edge of a semi-cylindrical lip is attached to the top surface of the upper funnel. A semicircular top area of a semi-cylindrical middle funnel is attached to the bottom surface of the upper funnel. A semicircular top end of a tapered semi-cylindrical lower funnel is attached to the bottom area of the middle funnel. A substantially U-shaped channel is continuously disposed from the lip to the lower funnel. A crimp protrusion is medially disposed on the lip. A screen is disposed within the interior cavity between the bottom surface of the upper funnel and the top area of the middle funnel. The lip removably extends around a lower portion of a lawn mower oil drain plug.

3 Claims, 3 Drawing Sheets

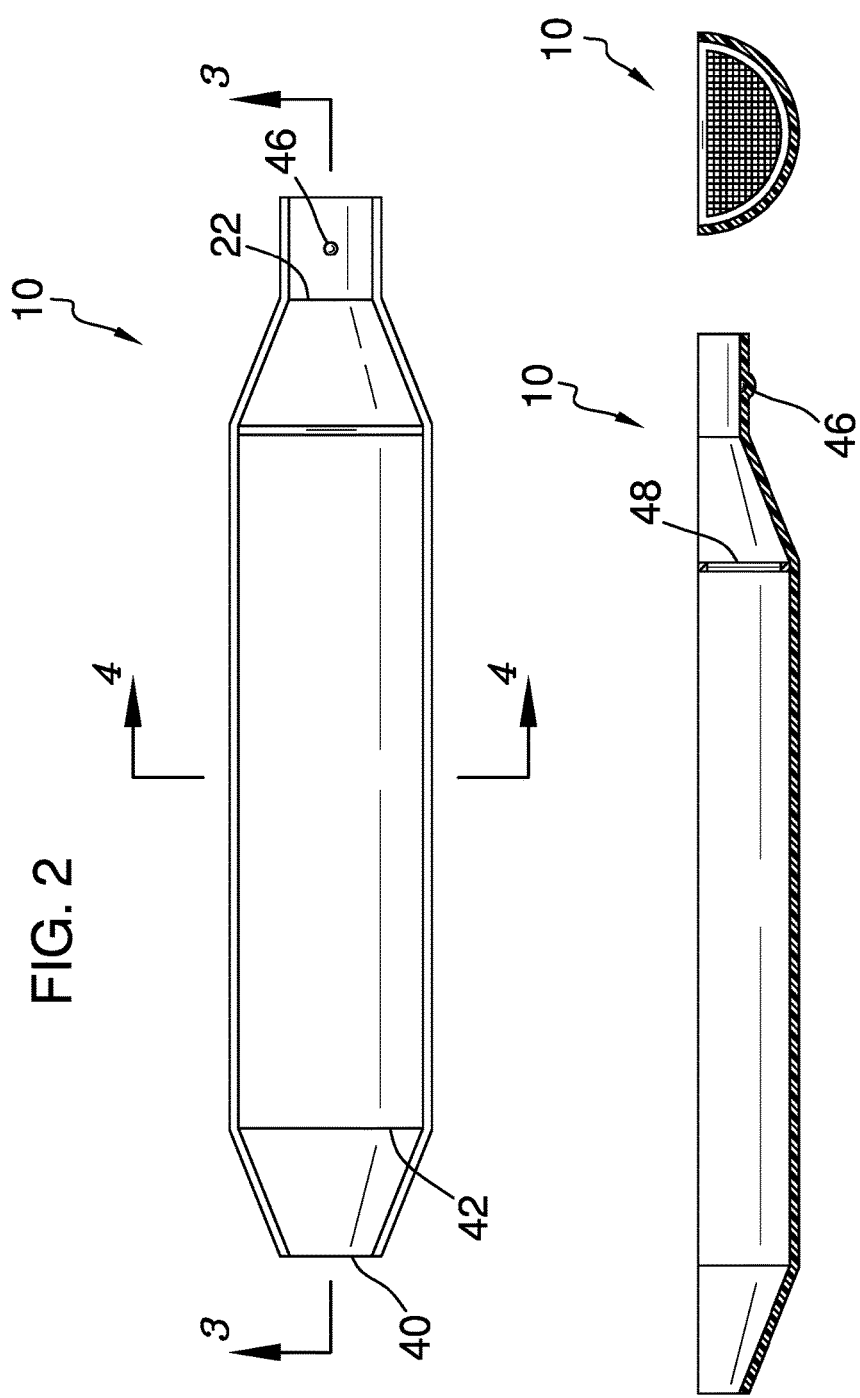

OIL DRAINAGE APPARATUS FOR A LAWN MOWER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of oil drainage apparatuses are known in the prior art. However, what has been needed is an oil drainage apparatus for a lawn mower including a tapered semi-cylindrical upper funnel having a semicircular top surface and a semicircular bottom surface, a semicircular bottom edge of a semi-cylindrical lip attached to the top surface of the upper funnel, a semicircular top area of a semi-cylindrical middle funnel attached to the bottom surface of the upper funnel, and a semicircular top end of a tapered semi-cylindrical lower funnel attached to the bottom area of the middle funnel. What has been further needed is a substantially U-shaped channel continuously disposed from the lip to the lower funnel, a crimp protrusion medially disposed on the lip, and a screen disposed within the interior cavity between the bottom surface of the upper funnel and the top area of the middle funnel. Lastly, what has been needed is for the lip to removably extend around a lower portion of a lawn mower oil drain plug and for the lower funnel to be disposed within an oil collection pan. The oil drainage apparatus for a lawn mower thus provides a user with a quick and easy way in which to drain used oil from a mower and protects the environment by eliminating the need for the user to drain the oil onto an outdoor surface.

FIELD OF THE INVENTION

The present invention relates to oil drainage apparatuses, and more particularly, to an oil drainage apparatus for a lawn mower.

SUMMARY OF THE INVENTION

The general purpose of the present oil drainage apparatus for a lawn mower, described subsequently in greater detail, is to provide an oil drainage apparatus for a lawn mower which has many novel features that result in an oil drainage apparatus for a lawn mower which is not anticipated, rendered obvious, suggested, or even implied by prior art, either alone or in combination thereof.

To accomplish this, the present oil drainage apparatus for a lawn mower includes a tapered semi-cylindrical upper funnel having a semicircular top surface and a semicircular bottom surface. A semi-cylindrical lip has a semicircular top edge and a semicircular bottom edge attached to the top surface of the upper funnel. A diameter of the top surface of the upper funnel is equal to a diameter of the lip, and the diameter of the top surface of the upper funnel is less than a diameter of the bottom surface of the upper funnel. A semi-cylindrical middle funnel has a semicircular bottom area and a semicircular top area attached to the bottom surface of the upper funnel. The diameter of the bottom surface of the upper funnel is equal to a diameter of the middle funnel. A tapered semi-cylindrical lower funnel has a semicircular bottom end and a semicircular top end attached to the bottom area of the middle funnel. A diameter of the top end of the lower funnel is equal to the diameter of the middle funnel, and the diameter of the top end of the lower funnel is greater than a diameter of the bottom end of the lower funnel. Each of the lip, the upper funnel, the middle funnel, and the lower funnel is optionally plastic for better durability and transportability.

The oil drainage apparatus for a lawn mower further includes a substantially U-shaped channel, a substantially circular downwardly extended crimp protrusion, and a semi-circular screen. The channel is continuously disposed from the top edge of the lip to the bottom end of the lower funnel, the crimp protrusion is medially disposed on the lip, and the screen is disposed within the channel between the bottom surface of the upper funnel and the top area of the middle funnel. The lip removably extends around a lower portion of a lawn mower oil drain plug. Furthermore, the lower funnel is disposed within an oil collection pan and the middle funnel is downwardly extended from the upper funnel when the lip is extended around the lower portion of the lawn mower oil drain plug. As a result, oil is configured to drain from the lawn mower oil drain plug through the channel and into the oil collection pan when the lip is extended around the lower portion of the lawn mower oil drain plug. A combined length of the lip, the upper funnel, the middle funnel, and the lower funnel is in a range of approximately 14 inches to 15 inches in order to adequately allow the drainage of oil through the channel.

Thus has been broadly outlined the more important features of the present oil drainage apparatus for a lawn mower so that the detailed description thereof that follows may be better understood and in order that the present contribution to the art may be better appreciated.

BRIEF DESCRIPTION OF THE DRAWINGS

Figures

FIG. 2 is a top plan view.
FIG. 3 is a cross-sectional view taken along line 3-3 of FIG. 2.
FIG. 4 is a cross-sectional view taken along line 4-4 of FIG. 2.

DETAILED DESCRIPTION OF THE DRAWINGS

Figure 1:
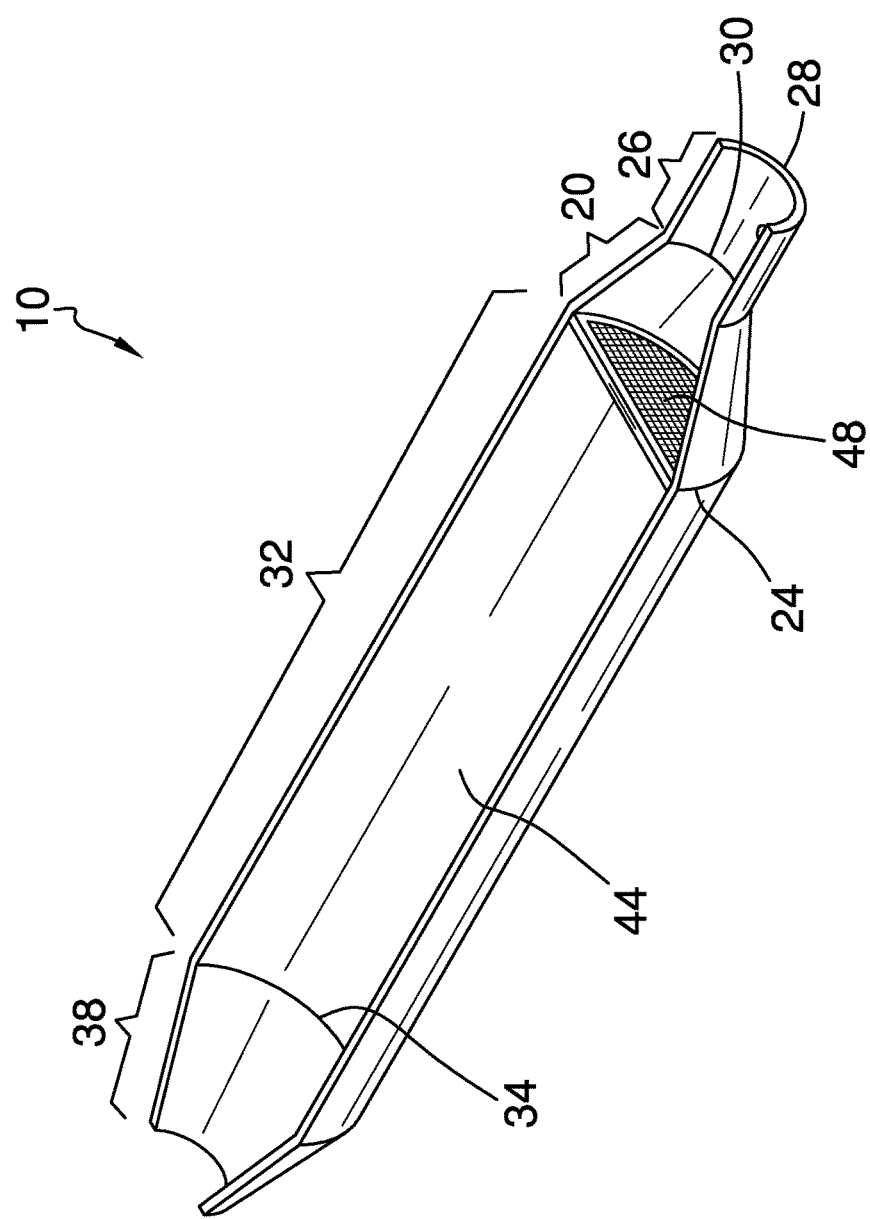
FIG. 1 is a front isometric view.
Figure 5:
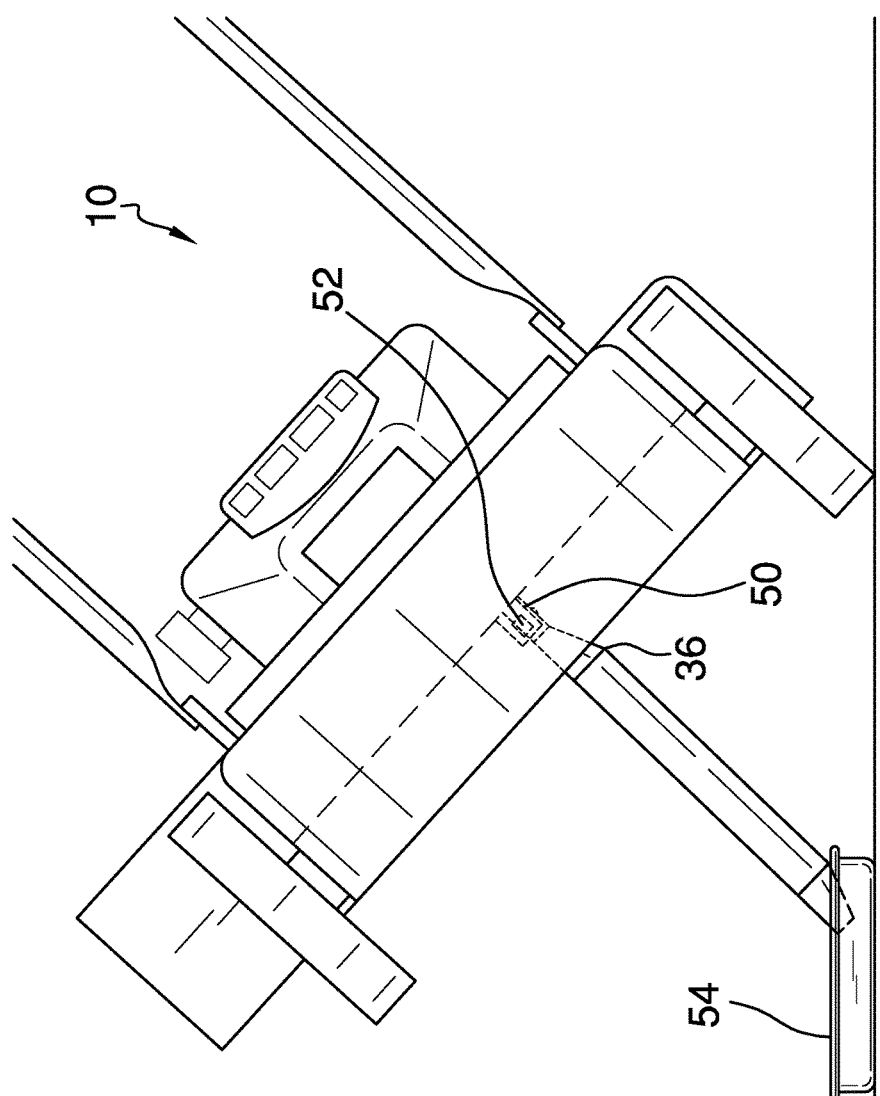
FIG. 5 is an in use view.

With reference now to the drawings, and in particular FIGS. 1 through 5 thereof, an example of the instant oil drainage apparatus for a lawn mower employing the principles and concepts of the present oil drainage apparatus for a lawn mower and generally designated by the reference number 10 will be described.

Referring to FIGS. 1 through 5 the present oil drainage apparatus for a lawn mower 10 is illustrated. The oil drainage apparatus for a lawn mower 10 includes a tapered semi-cylindrical upper funnel 20 having a semicircular top surface 22 and a semicircular bottom surface 24. A semi-cylindrical lip 26 has a semicircular top edge 28 and a semicircular bottom edge 30 attached to the top surface 22 of the upper funnel 20. A diameter of the top surface 22 of the upper funnel 20 is equal to a diameter of the lip 26, and the diameter of the top surface 22 of the upper funnel 20 is less than a diameter of the bottom surface 24 of the upper funnel 20. A semi-cylindrical middle funnel 32 has a semicircular bottom area 34 and a semicircular top area 36 attached to the bottom surface 24 of the upper funnel 20. The diameter of the bottom surface 24 of the upper funnel 20 is equal to a diameter of the middle funnel 32. A tapered semi-cylindrical lower funnel 38 has a semicircular bottom end 40 and a semicircular top end 42 attached to the bottom area 34 of the middle funnel 32. A diameter of the top end 42 of the lower funnel 38 is equal to the diameter of the middle funnel 32, and the diameter of the top end 42 of the lower funnel 38 is greater than a diameter of the bottom end 40 of the lower funnel 38. Each of the lip 26, the upper funnel 20, the middle funnel 32, and the lower funnel 38 is optionally plastic.

The oil drainage apparatus for a lawn mower 10 further includes a substantially U-shaped channel 44, a substantially circular downwardly extended crimp protrusion 46, and a semicircular screen 48. The channel 44 is continuously disposed from the top edge 28 of the lip 26 to the bottom end 40 of the lower funnel 38, the crimp protrusion 46 is medially disposed on the lip 26, and the screen 48 is disposed within the channel 44 between the bottom surface 24 of the upper funnel 20 and the top area 36 of the middle funnel 32. The lip 26 removably extends around a lower portion 50 of a lawn mower oil drain plug 52. Furthermore, the lower funnel 38 is disposed within an oil collection pan 54 and the middle funnel 32 is downwardly extended from the upper funnel 20 when the lip 26 is extended around the lower portion 50 of the lawn mower oil drain plug 52. As a result, oil is configured to drain from the lawn mower oil drain plug 52 through the channel 44 and into the oil collection pan 54 when the lip 26 is extended around the lower portion 50 of the lawn mower oil drain plug 52. A combined length of the lip 26, the upper funnel 20, the middle funnel 32, and the lower funnel 38 is in a range of approximately 14 inches to 15 inches.

What is claimed is:

1. An oil drainage apparatus for a lawn mower comprising:
    a tapered semi-cylindrical upper funnel having a semicircular top surface and a semicircular bottom surface;
    a semi-cylindrical lip having a semicircular top edge and a semicircular bottom edge attached to the top surface of the upper funnel;
    wherein a diameter of the top surface of the upper funnel is equal to a diameter of the lip;
    wherein the diameter of the top surface of the upper funnel is less than a diameter of the bottom surface of the upper funnel;
    a semi-cylindrical middle funnel having a semicircular bottom area and a semicircular top area attached to the bottom surface of the upper funnel;
    wherein the diameter of the bottom surface of the upper funnel is equal to a diameter of the middle funnel;
    a tapered semi-cylindrical lower funnel having a semicircular bottom end and a semicircular top end attached to the bottom area of the middle funnel;
    wherein a diameter of the top end of the lower funnel is equal to the diameter of the middle funnel;
    wherein the diameter of the top end of the lower funnel is greater than a diameter of the bottom end of the lower funnel;
    a substantially U-shaped channel continuously disposed from the top edge of the lip to the bottom end of the lower funnel;
    a substantially circular downwardly extended crimp protrusion medially disposed on the lip; and
    a semicircular screen disposed within the channel between the bottom surface of the upper funnel and the top area of the middle funnel;
    wherein the lip removably extends around a lower portion of a lawn mower oil drain plug;
    wherein the lower funnel is disposed within an oil collection pan and the middle funnel is downwardly extended from the upper funnel when the lip is extended around the lower portion of the lawn mower oil drain plug;
    wherein oil is configured to drain from the lawn mower oil drain plug through the channel and into the oil collection pan when the lip is extended around the lower portion of the lawn mower oil drain plug.

2. The oil drainage apparatus for a lawn mower of claim 1 wherein a combined length of the lip, the upper funnel, the middle funnel, and the lower funnel is in a range of approximately 14 inches to 15 inches.

3. The oil drainage apparatus for a lawn mower of claim 2 wherein each of the lip, the upper funnel, the middle funnel, and the lower funnel is plastic.

\* \* \* \* \*